United States Patent [19]

Murayama

[11] Patent Number: 5,259,745

[45] Date of Patent: Nov. 9, 1993

[54] DEVICE FOR FORMING ANNULAR LINER

[75] Inventor: Kashiwa Murayama, Fujisawa, Japan

[73] Assignee: Japan Crown Cork Co., Ltd., Tokyo, Japan

[21] Appl. No.: 713,844

[22] Filed: Jun. 12, 1991

[30] Foreign Application Priority Data

Jun. 20, 1990 [JP] Japan .................. 2-160016
Aug. 29, 1990 [JP] Japan .................. 2-225272

[51] Int. Cl.$^5$ .................. B29C 63/00
[52] U.S. Cl. .................. 425/110; 264/268; 425/126.1; 425/129.1; 425/809
[58] Field of Search .................. 425/809, 110, 113, 127, 425/385, 114, 126.1, 129.1; 264/268; 413/58, 60

[56] References Cited

U.S. PATENT DOCUMENTS

| | | | |
|---|---|---|---|
| 3,674,393 | 7/1972 | Timson | 425/809 |
| 3,827,843 | 8/1974 | Blouch | 425/809 |
| 3,873,258 | 3/1975 | Ratliff | 425/809 |
| 3,877,497 | 4/1975 | Busi | 425/809 |
| 4,140,451 | 2/1979 | Herdzina et al. | 425/809 |
| 4,260,483 | 4/1981 | Nicholson et al. | 425/809 |
| 4,336,011 | 6/1982 | George et al. | 425/110 |
| 4,388,058 | 6/1983 | Kubo | 425/110 |
| 4,398,875 | 8/1983 | Kawashima et al. | 425/809 |
| 4,412,797 | 11/1983 | Murayama | 425/114 |
| 4,518,336 | 5/1985 | Alieri | 425/110 |
| 4,756,857 | 7/1988 | Dezio et al. | 425/809 |
| 4,776,782 | 10/1988 | Murayama et al. | 425/809 |

*Primary Examiner*—Scott Bushey
*Attorney, Agent, or Firm*—Beveridge, DeGrandi, Weilacher & Young

[57] ABSTRACT

An apparatus equipped with a molding means for molding an annular liner on the inside surface of top panel of a container closure shell. The molding means includes an anvil on which the container closure shell is placed in an inverted state, and a press tool assembly which is disposed above the anvil to ascend or descend relative to the anvil. The press tool assembly includes a punch member, an excess resin counter member arranged on the outside of the punch member, a bushing member arranged on the outside of the excess resin counter member, and a sleeve member arranged on the outside of the bushing member. The sleeve member has a passage notch and a non-passage notch. A feeder nozzle is disposed to feed a synthetic resin material into the press tool assembly, the nozzle having a discharge port positioned in the moving path of passage notch. The synthetic resin material discharged from the discharge port enters into the sleeve member through the non-passage notch and is cut away from the discharge port.

17 Claims, 9 Drawing Sheets

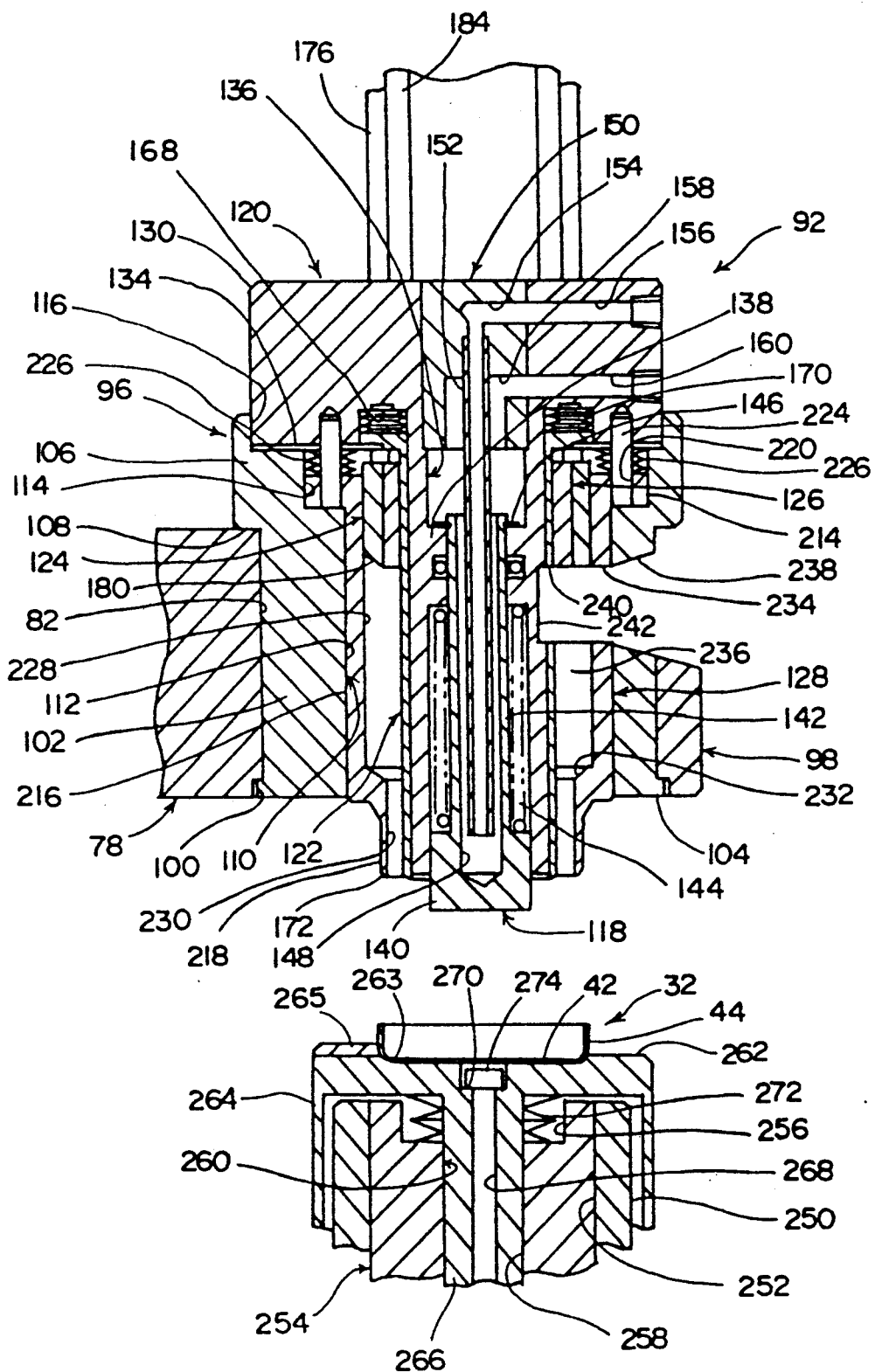
Fig.3-A

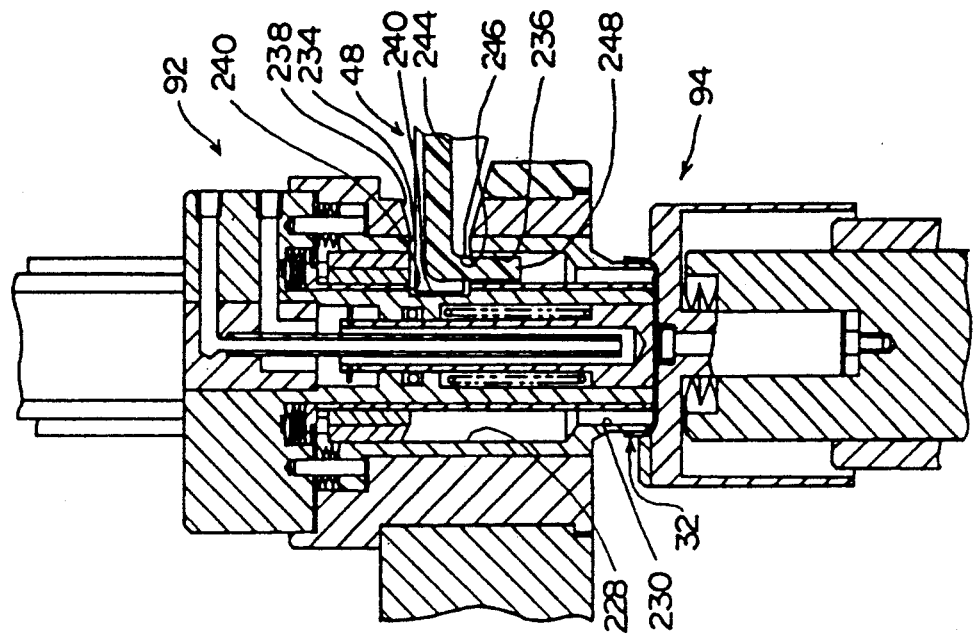
Fig.3-C
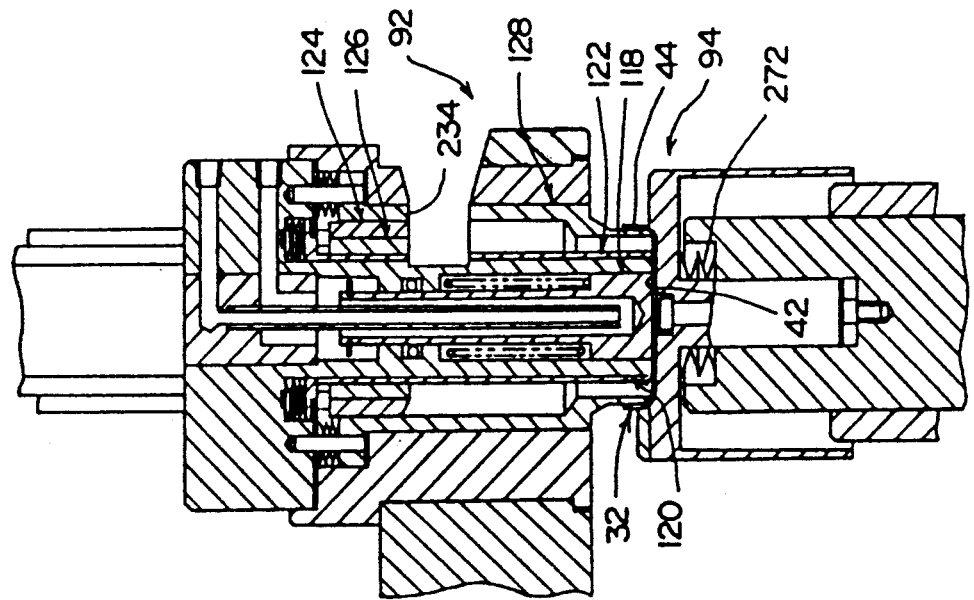
Fig.3-B

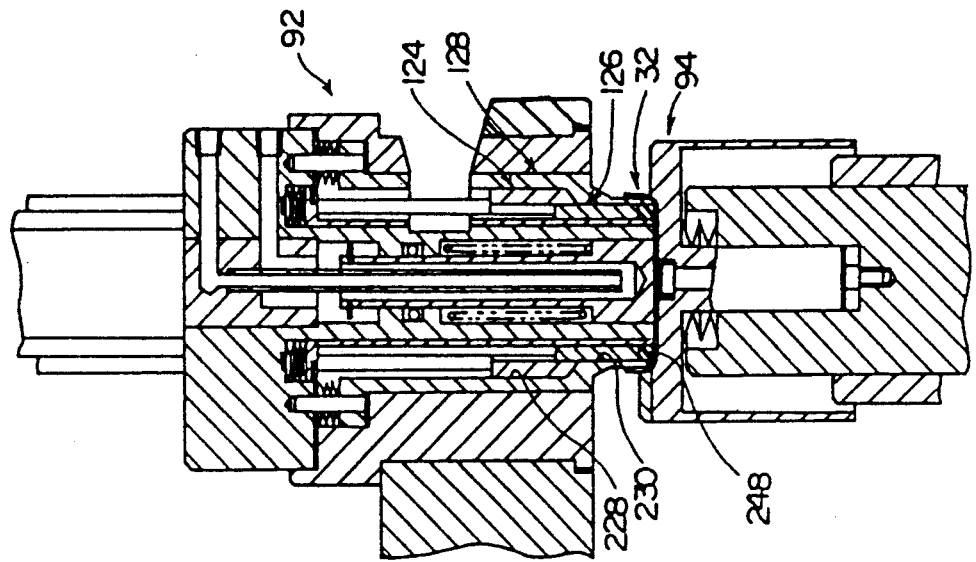
Fig.3-E
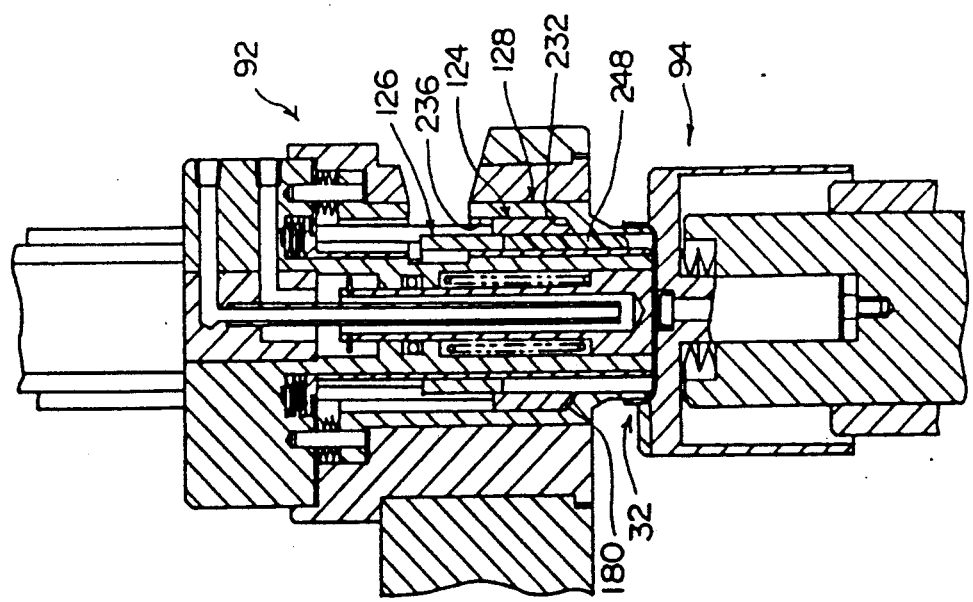
Fig.3-D

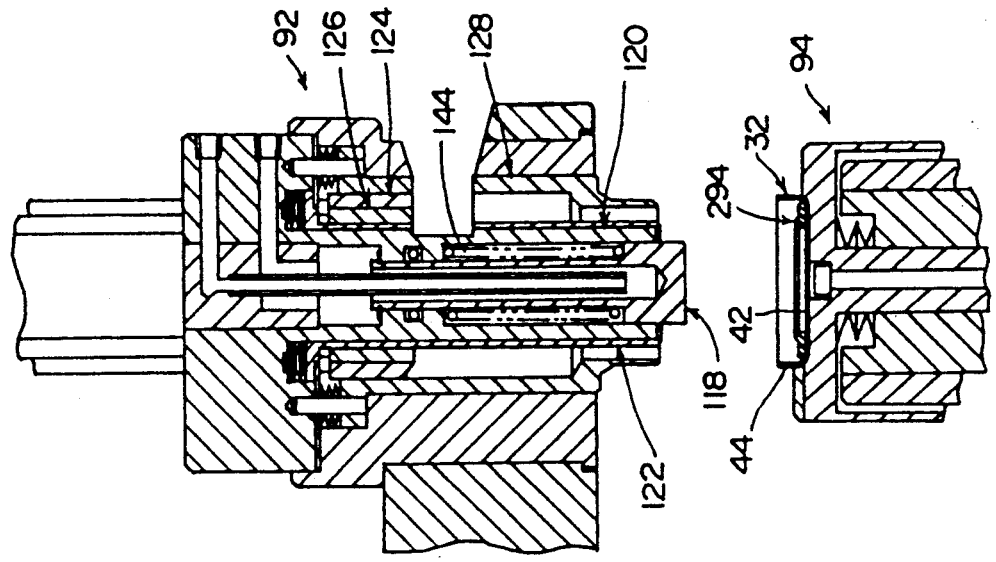
Fig.3-G
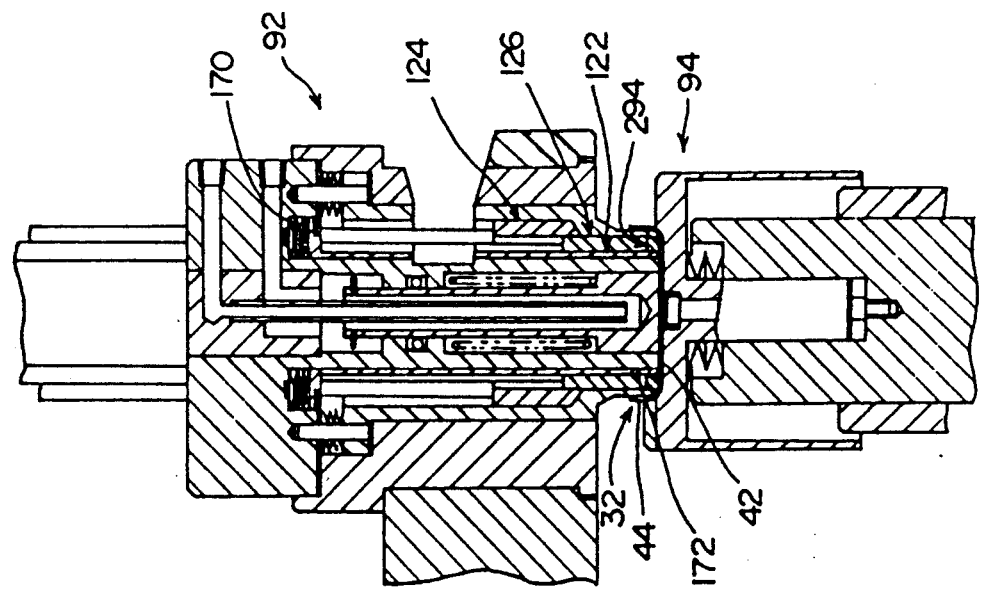
Fig.3-F

DEVICE FOR FORMING ANNULAR LINER

FIELD OF THE INVENTION

The present invention relates to an apparatus for forming an annular liner in a container closure shell in a container closure such as a bottle closure and a can closure.

DESCRIPTION OF THE PRIOR ART

It is widely accepted practice to provide the inside surface of the top panel of a container closure shell made of a thin metal plate or a synthetic resin with a liner that is molded from a relatively soft synthetic resin in order to impart desired excellent sealability to the container closure, as is commonly known among people skilled in the art. A disk-like liner is provided in many cases when the container closure shell has a relatively small internal diameter. When the container closure shell has a relatively large internal diameter, however, it is desired that only the peripheral edge of the top panel is provided with an annular liner from the standpoint of saving the liner material.

The annular liner of a synthetic resin is usually formed by the so-called spin lining method according to which an unfoamed synthetic resin material under the softened condition is supplied to the peripheral edge in the top panel of the container closure shell, and then heated to foam. The foaming synthetic resin such as foaming vinyl chloride resin used for the spin linking method is, however relatively expensive and moreover, a sanitary problem is pointed out though it has not yet been confirmed. In recent years, therefore, it has been proposed to form an annular liner of a synthetic resin by the press molding that is ordinarily used for forming a disk-like liner.

Japanese Patent Publication No. 58088/1988 (U.S. Pat. No. 4,388,058) discloses a press-molding apparatus for press-molding an annular liner of a synthetic resin on the inside surface of the top panel of a container closure shell. This press-molding apparatus comprises an anvil and a press tool assembly which is disposed above the anvil and moves in a direction to approach and separate away from the anvil. The press tool assembly includes a punch member, a cylindrical bushing member arranged on the outside of the punch member, and a cylindrical sleeve member arranged on the outside of the bushing member. The container closure shell fed with a molten synthetic resin material in an annular form on the inside surface of the top panel thereof is positioned on the anvil, and the press tool assembly enters into the container closure so that the annular synthetic resin material is press-molded into an annular liner. As for a system for feeding the annular synthetic resin material onto the inside surface of top panel of the container closure shell, the above Japanese Patent Publication No. 58088/1988 quotes Japanese Laid-Open Patent Publication No. 77523/1980 (U.S. Pat. No. 4,412,797) instead of giving a concrete description. This Japanese Laid-Open Patent Publication No. 77523/1980 discloses a system in which a molten synthetic resin is extruded by an extruder via an annular discharge port and is fed onto the inside surface of top panel of the container closure shell.

However, the conventional apparatus for forming an annular liner on the inside surface of top panel of the container closure shell is complex in construction and is expensive since a very complicated mechanism is required to feed the synthetic resin material in an annular form onto the inside surface of top panel of the container closure shell. Moreover, a considerable period of time is required for forming the liner making it difficult to achieve the molding highly efficiently.

Furthermore, the conventional apparatus for forming annular liners involves the following problems. As is widely known among people skilled in the art, it is virtually impossible to strictly accurately control the amount of a synthetic resin material to be fed, and variation exists to some extent in this amount. In the conventional apparatus for molding annular liners, the final position of the bushing member varies relative to the anvil (i.e., relative to the inside surface of top panel of the container closure shell) depending upon the amount of the synthetic resin material to be fed. Therefore, the thickness of a main region of the annular liner defined by the lower end of the bushing member becomes different depending on a change in the amount of the synthetic resin material to be fed. Here, the main region of the annular liner is a region which is pressed onto the upper end of the port of the container and has a direct effect on the sealability. With the annular liners formed by the conventional annular liner-molding apparatus, therefore, the sealability of the container closures is not sufficiently stabilized and there was the possibility of producing unacceptable products. In order to solve the above-mentioned problem that stems from a change in the amount of the synthetic resin material fed, it is important to change the shape or size of the liner depending upon a change in the amount of the synthetic resin material fed in a region that does not affect the sealability. In addition, it is desirable that a change in the shape or size of the liner that is pressmolded should not cause a local irregularity in, for example, the circumferential direction, which makes the liner ill-shaped to such a degree that it can be perceived by the consumers.

SUMMARY OF THE INVENTION

A first object of the present invention, therefore, is to solve the above-mentioned problems inherent in the conventional apparatus for forming an annular liner by employing a peculiar system for feeding the synthetic resin material without requiring a complex and expensive mechanism, and enabling the synthetic resin material that is necessary for pressolding the annular liner to be fed as required and sufficiently quickly.

A second object of the present invention is to provide an apparatus for forming an annular liner which is capable of suitably compensating a change in the amount of the synthetic resin material feed without causing the liner to become ill-shaped or without adversely affecting the sealability.

In order to achieve the first object according to the present invention, there is provided an apparatus for forming an annular liner on the inside surface of a container closure shell comprising:

a molding means which is conveyed through a container closure shell receiving zone, a resin material receiving zone, a molding zone and a container closure discharge zone in the order mentioned or is conveyed through said resin material receiving zone and said container shell receiving zone in the order contrary to the above;

a container closure shell feeding means which feeds a container closure shell having a circular top panel to said molding means in said container closure shell receiving zone;

a resin material feeding means which feeds a synthetic resin material to said molding means in said resin material receiving zone; and a container closure discharge means which discharges the container closure consisting of a container closure shell and an annular liner formed on the inside surface of the top panel from said molding means in said container closure discharge zone; wherein said molding means includes an anvil on which the container closure shell is placed in an inverted state, and a press tool assembly which is disposed over said anvil being faced thereto and moves in a direction to approach or separate away from said anvil;

said press tool assembly includes a punch member, a cylindrical bushing member arranged on the outside of said punch member and a cylindrical sleeve member arranged on the outside of said bushing member, said bushing member being allowed to ascend or descend relative to said punch member and said sleeve member;

the upper portion of said sleeve member is provided with a passage notch which extends in the circumferential direction over a required angular range and with a non-passage notch formed adjacent to said passage notch under or over thereof, said non-passage notch being cut away on the downstream side only of said passage notch in a direction in which said molding means moves;

said resin material feeding means includes a feeder nozzle which is positioned in a moving path of said passage notch and which has a discharge port that is open downwardly or upwardly;

when said molding means moves passing through said resin material receiving zone, said bushing member in said press tool assembly is positioned above said passage notch formed in said sleeve member, said feeder nozzle is caused to move passing through said passage notch, and the molten synthetic resin material discharged from said discharge port of said feeder nozzle enters into said sleeve member passing through said non-passage notch in said sleeve member of said press tool assembly, is cut away from said discharge port of said feeder nozzle, and is thus fed to said press tool assembly; and said bushing member is lowered relative to said punch member and said sleeve member in said molding zone, and the synthetic resin material is carried onto the inside surface of the top panel of the container closure shell and is molded into an annular liner.

In the apparatus for forming annular liners of the present invention, the synthetic resin material is automatically fed into the sleeve member of the press tool assembly at the time when the molding means moves passing the resin material receiving zone. Therefore, the synthetic resin material is fed without requiring an extended period of time, and the annular liners are formed highly efficiently. In addition, the mechanism for feeding the resin material is considerably simpler than the conventional mechanisms, and the entire apparatus is constructed considerably simply and at low costs compared with the conventional apparatuses.

In order to achieve the above-mentioned second object according to the present invention, there is provided an apparatus for forming an annular liner of a synthetic resin on the inside surface of top panel of a container closure shell, comprising:

a molding means that includes an anvil on which said container closure shell is placed in an inverted state, a press tool assembly which is disposed being opposed to said anvil and moves relative to said anvil in a direction to approach or separate away from said anvil, and a relatively moving means which moves said anvil and said press tool assembly in a direction in which they approach or separate away relative to each other; wherein said press tool assembly includes a punch member, a cylindrical excess resin counter member arranged on the outside of said punch member, a cylindrical bushing member arranged on the outside of said excess resin counter member, and a cylindrical sleeve member arranged on the outside of said bushing member;

said excess resin counter member of said press tool assembly is mounted to move in a direction to approach and separate away from said anvil over a predetermined range, and a resiliently urging means is disposed to resiliently urge said excess resin counter member toward said anvil; and when said annular liner is to be pressmolded, said anvil and said press tool assembly are moved in a direction to approach to each other, said press tool assembly enters into said container closure shell which is placed on said anvil, at least the outer peripheral edge of the lower surface of said punch member is brought into contact with the inside surface of said top panel of said container closure shell to define the inner peripheral edge of said liner, the outer peripheral edge of said liner is defined by the lower end of said sleeve member, and the synthetic resin material to be press-molded into said liner acts on said excess resin counter member so as to move said excess resin counter member in a direction to separate away from said anvil against the resiliently urging action of said resiliently urging means, such that a change in the amount of the synthetic resin material fed is compensated.

According to the apparatus for forming annular liners of the present invention, the final position of the excess resin counter member changes relative to the anvil (i.e., relative to the inside surface of the top panel of a container closure) depending upon a change in the amount of the synthetic resin material fed, and the thickness of a region of the liner defined by the excess resin counter member undergoes a change. The region of the liner defined by the excess resin counter member is located on the innermost periphery of the annular liner, and there is no likelihood that the sealability is adversely affected by a variation in the thickness of the above region. Further, a change in the thickness of the innermost of the liner caused by a change in the amount of the synthetic resin material fed can be sufficiently uniformalized in the circumferential direction, and the amount of change of the thickness is restricted to a very small value. Since the amount of the synthetic resin material fed is compensated, the liner is not ill-shaped to a degree that can be easily perceived by the consumers.

BRIEF DESCRIPTION OF THE DRAWINGS

FIGS. 3-A, 3-B, 3-C, 3-D, 3-E, 3-F and 3-G are partial sectional views for explaining the action of the main rotary molding apparatus of FIG. 2;

DETAILED DESCRIPTION OF THE PREFERRED EMBODIMENTS

Embodiments of the apparatus for forming an annular liner constituted according to the present invention will now be described in further detail in conjunction with the accompanying drawings.

Figure 1:
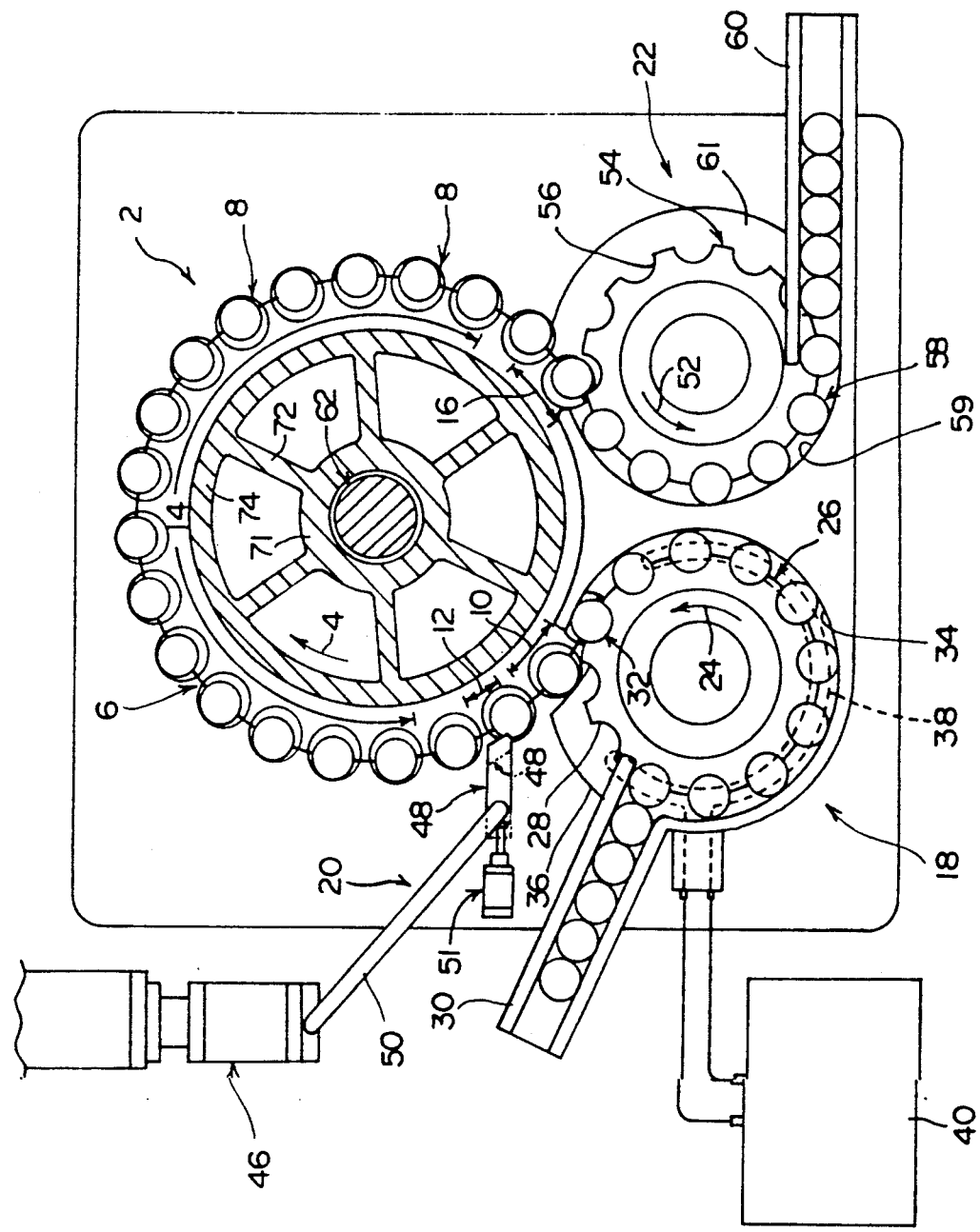
FIG. 1 is a schematic plan view showing a whole apparatus for forming an annular liner constituted according to the present invention.

Referring to FIG. 1, the apparatus for forming a liner is equipped with a main rotary molding device as generally designated at 2. As will be described later in further detail, the main molding apparatus 2 includes a rotary support member 6 that is continuously rotated in a direction indicated by arrow 4 with an axis that substantially extends vertically (in a direction perpendicular to the surface of paper in FIG. 1) as a center. On the support member 6 are mounted a plurality of (twenty-four in the diagramed case) molding means 8 at an equal distance in the circumferential direction. As the support member 6 is continuously rotated in the direction indicated by arrow 4, each of the molding means 8 moves along a circular moving path successively passing a container closure shell receiving zone 10, a resin material receiving zone 12, a molding zone 14 and a container closure discharge zone 16. If desired, the container closure shell receiving zone 10 and the resin material receiving zone 12 are arranged in the reverse order, such that the molding means 8 will pass the container closure shell receiving zone 10 after having passed the resin material receiving zone 12.

A container closure shell feeding means 18 is disposed in relation to the container closure shell receiving zone 10, a resin material feeding means 20 is disposed in relation to the resin material receiving zone 12, and a container closure discharge means 22 is disposed in relation to the container closure discharge zone 16. The container closure shell feeding means 18 in the diagramed embodiment is constituted by a rotary turret mechanism and includes a turret 26 that continuously rotates in a direction indicated by arrow 24 with an axis extending substantially vertically (in a direction perpendicular to the surface of the paper in FIG. 1) as a center. A plurality (twelve in the diagramed case) of nearly semi-circular holder notches 28 are formed in the periphery of the turret 26 in the circumferential direction at an equal distance. Container closure shells 32 fed through an introduction chute 30 are partly held by the holder notches 28, conveyed in a direction indicated by arrow 24 with the turning of the turret 26, and are fed to each of the molding means 8 in the container closure receiving zone 10. Owing to a locking wall 34 extending along the periphery of the turret 26 from the downstream side of the introduction chute 30 to the upstream side of the container closure shell receiving zone 10, the container closure shells 32 are prevented from escaping the holder notches 28 outwardly in a radial direction while they are introduced into the holder notches 28 from the introduction chute 30 and conveyed in the direction indicated by arrow 24 up to the container closure shell receiving zone 10. A stationary support board 36 is disposed underneath the turret 26, and is provided with a high-frequency induction heating coil 38. The coil 38 is served with a high frequency from a high frequency generator 40 so as to heat the container closure shells 32 that are conveyed by the turret 26. The container closure shell 32 may be made of a suitable thin metal plate such as a thin aluminum plate, a thin steel plate treated with chromic acid or a thin tin-plated steel plate (or may be made of a suitable synthetic resin), and has, as shown in FIG. 3-A, a circular top panel 42 and a cylindrical skirt wall 44 that downwardly extends from the top panel 42. Engaging means such as a female thread or a lug may be formed on the skirt wall 44. The resin material feeding means 20 which is diagramed includes an extruder 46 that may be an ordinary one, a feeding nozzle 48, and a flexible conduit 50 that connects an outlet port of the extruder 46 with an inlet port of the feeding nozzle 48. The feeding nozzle 48 is equipped with a pneumatic pressure cylinder mechanism 51 and is selectively positioned at either an acting position indicated by a solid line or a non-acting position indicated by a two-dot chain line. The molten synthetic resin material extruded from the extruder 46 is fed to the feeding nozzle 48 through the flexible conduit 50, discharged through a discharge port of the feeding nozzle 48, and fed to the molding means 8 (the feeding nozzle 48 will be described later in further detail). The container closure discharge means 22 that is disposed in relation to the container closure discharge zone 16 is constituted by a rotary turret mechanism like the aforementioned container closure shell feeding means 18. That is, it includes a turret 54 that continuously rotates in a direction of arrow 52 with an axis extending substantially vertically (in a direction perpendicular to the surface of paper in FIG. 1) as a center. A plurality (twelve in the diagramed case) of nearly semi-circular holder notches 56 are formed in the periphery of the turret 54 at an equal distance in the circumferential direction. A container closure 58 (which has an annular liner formed as will be described later) discharged from the molding means 8 at the container closure discharge zone 16 is partly held by the holding notch 56 of the turret 54, conveyed in a direction indicated by arrow 52 with the turning of the turret 54, and is conveyed to a delivery chute 60. Owing to a locking wall 59 that extends along the periphery of the turret 54, the container closure 58 is prevented from escaping the holder notch 56 outwardly in the radial direction while it is conveyed by the turret 54 from the downstream side of the container closure discharge zone 16 through up to the upstream side of the delivery chute 60. A stationary support board 61 is disposed underneath the turret 54, and the container closure 58 that has been conveyed by the turret 54 slides on the support board 61. The container closure 58 delivered to the delivery chute 60 by the container closure discharge means 22 is then conveyed to a suitable place such as an inspection zone or a collection zone through the delivery chute 60. The rotary turret mechanism that constitute the container closure shell feeding means 18 and the container closure discharge means 22 is widely known among people skilled in the art, and therefore is not described in detail in this specification.

Figure 2:
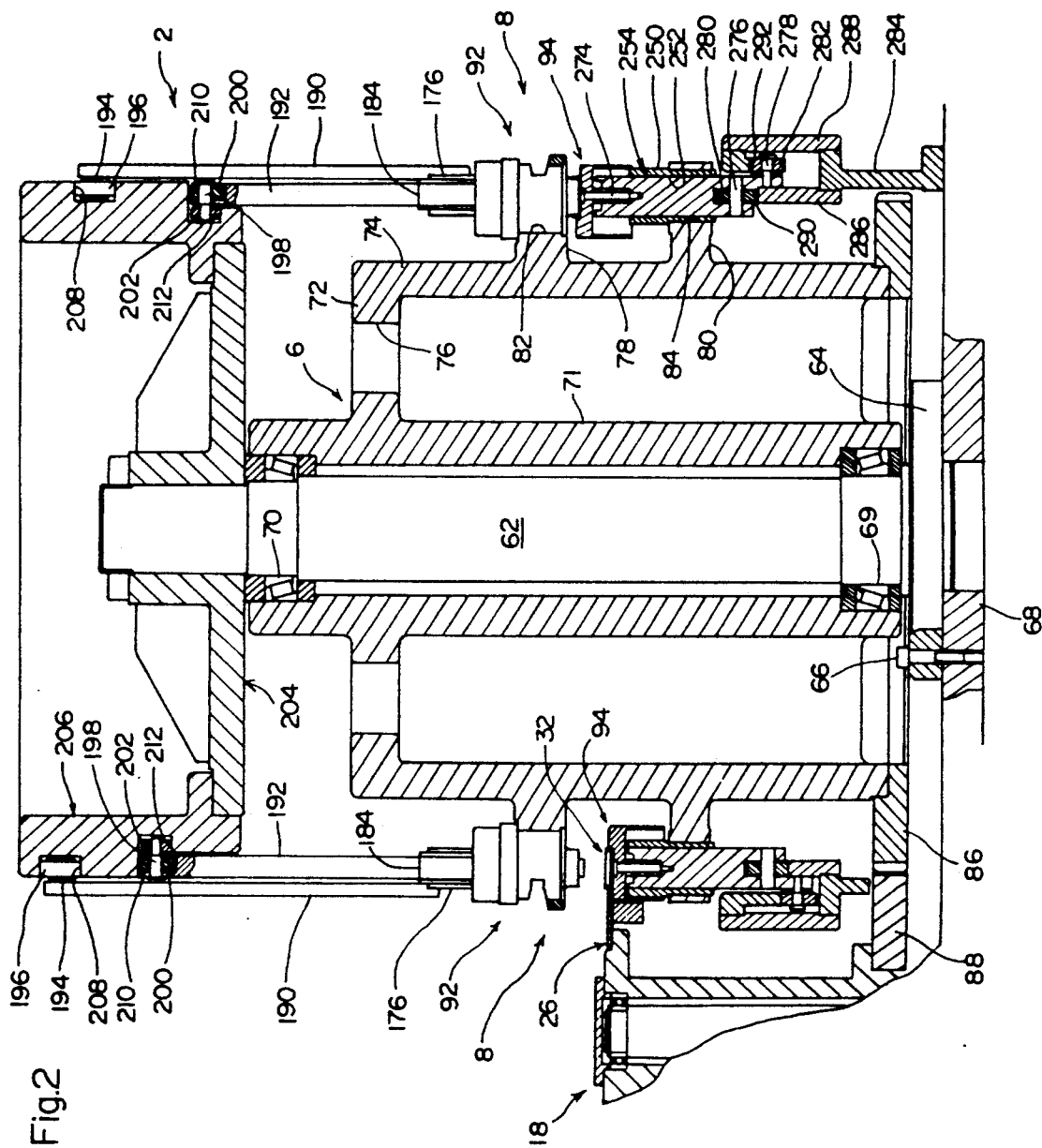
FIG. 2 is a section view showing a main rotary molding apparatus in the device for forming an annular liner of FIG. 1.

With reference to FIG. 2 together with FIG. 1, the main rotary molding apparatus 2 that is diagramed includes a stationary support shaft 62 that extends substantially vertically. A fixed flange 64 is formed at the lower end of the support shaft 62, and a plurality of coupling screws 66 (FIG. 2 shows only one of them) are screwed into a stationary horizontal base board 68 through the flange 64, so that the support shaft 62 is secured in the required position. The rotary support member 6 is rotatably fitted to the support shaft 62 via a lower bearing means 69 and an upper bearing means 70. As clearly shown in FIG. 2, the rotary support member 6 has an inner cylindrical portion 71, a connection wall 72 that horizontally extends outwardly in the radial direction from the upper portion of the inner cylindrical portion 71, and an outer cylindrical portion 74 that downwardly extends from the periphery of the connection wall 72. A plurality of openings 76 are formed in the connection wall 72 maintaining a distance in the circumferential direction. On the outer cylindrical portion 74 are formed an upper support flange 78 that outwardly and substantially horizontally protrudes in the radial direction from the upper portion thereof and a lower support flange 80 that outwardly and substantially horizontally protrudes in the radial direction from the lower portion thereof. A plurality (twenty-four in the diagramed case) of nearly semi-circular notches 82 are formed in the periphery of the upper support flange 78 at an equal distance in the circumferential direction, and a plurality (twenty-four in the diagramed case) of circular openings 84 are formed in the periphery of the lower support flange 80 at an equal angular distance in the circumferential direction. The centers of notches 82 formed in the upper support flange 78 and the centers of openings 84 formed in the lower support flange 80 are in alignment with each other in the vertical direction, and the molding means 8 are fitted to each of the pairs of notches 82 and openings 84. A coupling gear 86 is fastened to the lower end of the outer cylindrical portion 74 of the rotary support member 6. Another coupling gear 88 is fastened to the turret 26 in the container closure shell feeding means 18, and is engaged with the above gear 86. Moreover, though not diagramed, a coupling gear is fastened to the turret 54 in the container closure discharge means 22 and is engaged with the above gear 86, too. The gear 86 is coupled to a rotary drive source (not shown) which may be an electric motor and is continuously rotated in a direction indicated by arrow 4 in FIG. 1. The rotation is transmitted to the turret 26 in the container closure shell feeding means 18 via the gear 88, and is further transmitted to the turret 54 in the container closure discharge means 22 via a gear that is not shown. Thus, the turrets 26 and 54 are rotated in the directions indicated by arrows 24 and 52 in FIG. 1.

As described above, the molding means 8 are mounted on the upper support flange 78 and on the lower support flange 80 that are formed on the outer cylindrical portion 74 of the rotary support member 6. More specifically, a press tool assembly 92 of molding means 8 is fitted to the semi-circular notch 82 formed in the upper support flange 78, and an anvil 94 of molding means 8 is fitted to the circular opening 84 formed in the lower support flange 80.

Figure 4:
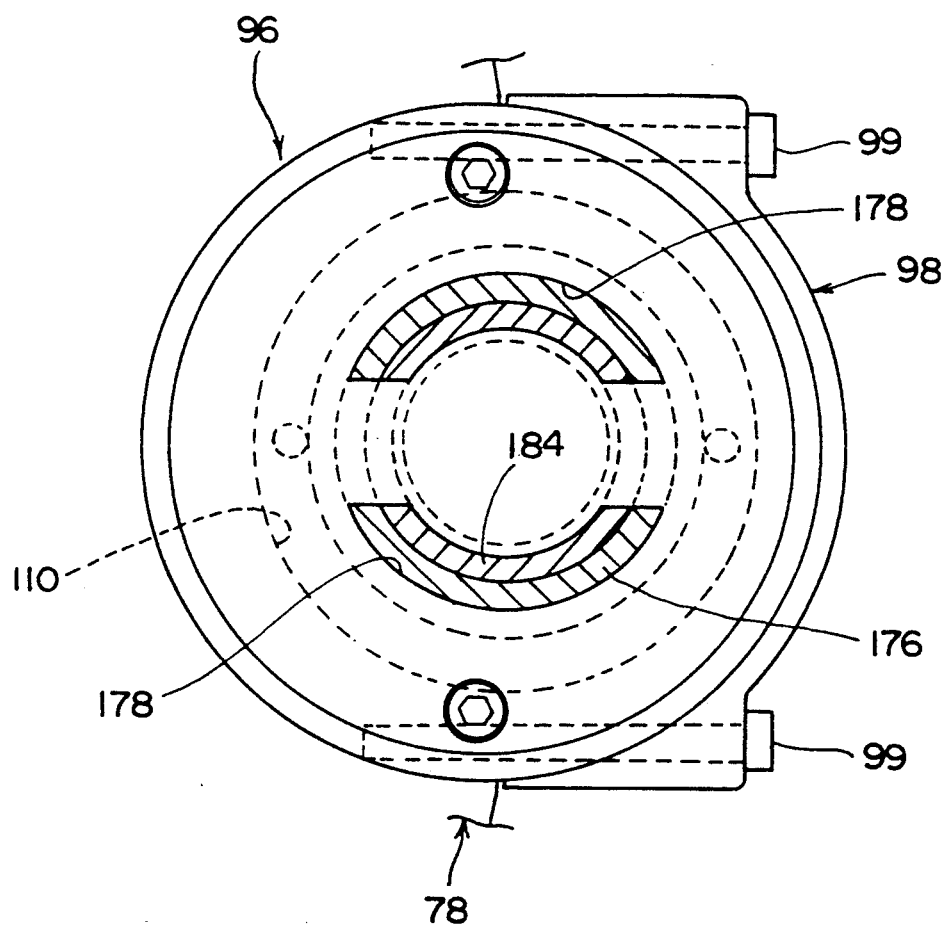
FIG. 4 is a partial sectional view showing a press tool assembly in a molding means in the main rotary molding apparatus of FIG. 2.

With reference to FIG. 3-A together with FIG. 2, a mounting member 96 is fitted to the semi-circular notch 82 formed in the upper support flange 78, and a fastening member 98 is fitted to the outside of the mounting member 96. As will be understood from FIG. 4, the fastening member 98 has nearly a semi-arcuate shape and a semi-circular inner peripheral surface. The fastening member 98 is fastened to the upper support flange 78 by the coupling screws 99 (FIG. 4) that are screwed into the upper support flange 78 through holes formed on both sides in the circumferential direction of the fastening member 98, whereby a mounting hole having a circular shape in cross section is defined by the semi-circular notch 82 formed in the upper support flange 78 in cooperation with the inner peripheral surface of the fastening member 98. As shown in FIG. 3-A, an engaging portion 100 is formed at the lower end of the notch 82 and at the lower end in the inner peripheral surface of the fastening member 98, the engaging portion 100 having a diameter slightly greater than that of the upper portion thereof. The mounting member 96 has a main portion 102 of a cylindrical shape with an external diameter that corresponds to the internal diameter of the mounting hole. At the lower end of the mounting member 96 is formed an engageable portion 104 having an external diameter corresponding to the internal diameter of the engaging portion 100. The upper end portion 106 of the mounting member 96 has an external diameter which is slightly greater than the external diameter of its main portion 102, and a downwardly faced annular shoulder surface 108 is formed at the boundary between the main portion 102 and the upper end portion 106. Splines are formed in the engaging portion 100 in the mounting hole and in the engageable portion 104 of the mounting member 96 such that they engage with each other to inhibit rotation relative to each other. The mounting member 96 is fitted to the notch 82 while setting the engageable portion 104 of the mounting member 96 to the engaging portion 100 of the mounting hole and then, the fastening member 98 is fastened to the upper support flange 78 so that the mounting member 96 is fastened to the upper support flange 78. The engageable portion 104 of the mounting member 96 is positioned in the engaging portion 100 in the mounting hole and part of the annular shoulder surface 108 of the mounting member 96 comes in contact with the upper surface of the upper support flange 78, whereby the mounting member 96 is prevented from moving to the vertical direction and further, the spline that is formed in the engageable portion 104 of the mounting member 96 and extends in the vertical direction engages with the spline that is formed in the engaging portion 100 in the mounting hole and extends in the vertical direction, whereby the mounting member 96 is prevented from rotating.

Figure 5:
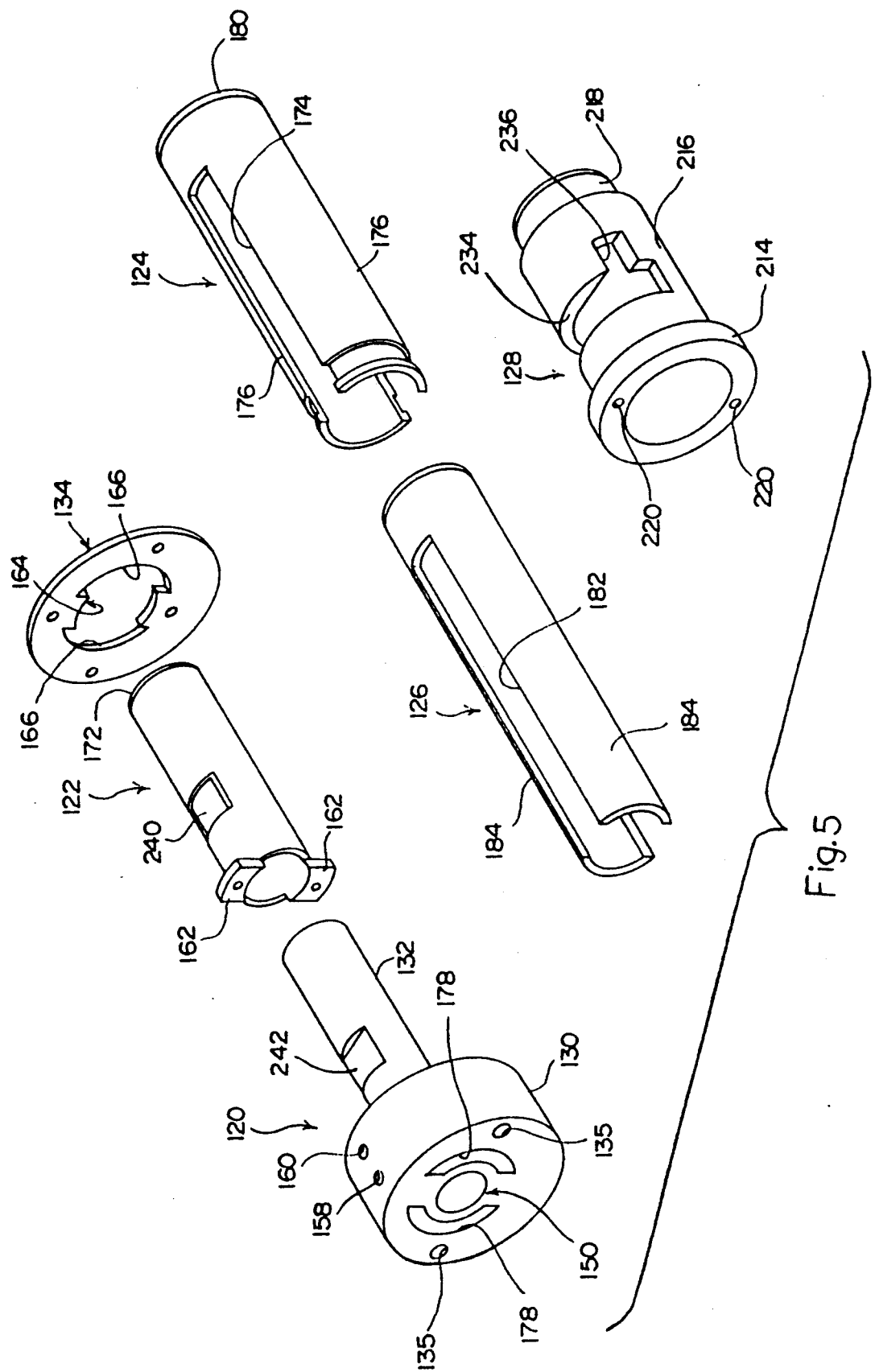
FIG. 5 is a perspective view showing the press tool assembly in the molding means in the main rotary molding apparatus of FIG. 2 in a disassembled manner.

With reference to FIG. 3-A, a through opening 110 is formed in the mounting member 96 in the vertical direction. In the diagramed embodiment, as will be understood with reference to FIG. 4, the center of the through opening 110 is slightly deviated outwardly in the radial direction with respect to the center of outer peripheral surface of the mounting member 96 as viewed from the center of rotation of the rotary support member 6. The through opening 110 has a circular shape in cross section, and includes a main portion 112, an intermediate portion 114 having an internal diameter which is slightly greater than the internal diameter of the main portion 112, and an upper end portion 116 having an internal diameter which is greater than the internal diameter of the intermediate portion 114. The press tool assembly 92 is fitted into the through opening 110 of the mounting member 96. With reference to FIG. 5 together with FIG. 3-A, the diagramed press tool assembly 92 includes a kick-out member 118, a punch member 120, an excess resin counter member 122, a push member 124, a bushing member 126 and a sleeve member 128.

The punch member 120 has a large-diameter head portion 130 and a cylindrical main portion 132 that downwardly extends from the central portion of the head portion 130. The external diameter of the head portion 130 of the punch member 120 corresponds to the internal diameter of the upper end portion 116 in the through opening 110 of the mounting member 96, and the head portion 130 is inserted in the upper end portion 116 in the through opening 110 of the mounting member 96. As shown in FIG. 3-A, an annular plate 134 is sandwiched between the bottom surface of upper end portion 116 of the through opening 110 and the head portion 130 of the punch member 120. Two through holes 135 are formed in the periphery of the head portion 130 of the punch member 120 at positions being opposed to each other in the direction of diameter thereof, and coupling screws (not shown) are screwed to the mounting member 96 (or more specifically, to the bottom surface of upper end portion 116 in the through opening 110) through the holes 135 so that the punch member 120 is secured to the mounting member 96. In the central portion of the punch member 120 is formed a through opening 136 that extends in the vertical direction, and the lower end of the punch member 120 has a cylindrical shape with required external diameter and internal diameter. An annular protuberance 138 protruding inwardly in the radial direction is formed on the through opening 136 of the punch member 120 at an intermediate portion in the axial direction. The kick-out member 118 is inserted in the through opening 136 of the punch member 120. The kick-out member 118 has a lower end portion 140 of a large diameter and a shaft portion 142 that upwardly extends from the central portion of the lower end portion 140. The external diameter of the lower end portion 140 of the kick-out member 118 corresponds to the internal diameter of the main portion of the through opening 136 of the punch member 120, and the external diameter of shaft portion 142 of the kick-out member 118 corresponds to the internal diameter of the annular protuberance 138 in the through opening 136 of the punch member 120. The shaft portion 142 of the kick-out member 118 is slidably inserted in the annular protrusion 138 in the through opening 136 of the punch member 120, and the lower end portion 140 of the kick-out member 118 is slidably accommodated in the lower end portion in the through opening 136 of the punch member 120. A resiliently urging means 144 which may be a compression coil spring is interposed between the upper surface of the lower end portion 140 of the kick-out member 118 and the lower surface of the annular protuberance 138 in the through opening 136. The resiliently urging means resiliently urges the kick-out member 118 downwardly in the vertical direction. An engaging ring 146 is fastened to the upper end portion of the shaft portion 142 of the kick-out member 118, and comes in contact with the upper surface of the annular protuberance 138 in the through opening 136, whereby the descending motion of the kick-out member 118 is restricted. In the kick-out member 118 is formed a hole that downwardly extends from the upper end thereof up to near the lower end thereof. On the other hand, a plug member 150 is secured to the upper end of the through opening 136 of the punch member 120. To the plug member 150 is secured a tubular member 152 that downwardly extends through the hole 148 of the kick-out member 118. In the plug member 150 is formed a flow-in path 154 that extends slightly above the upper end of the tubular member 152 and then outwardly extends in the radial direction, and in the head portion 130 of the punch member 120 is formed a flow-in path 156 that outwardly extends in the radial direction, following the flow-in path 154, up to the outer peripheral surface of the head portion 130. In the plug member 150 is further formed a flow-out path 158 that upwardly extends in the periphery of the tubular member 152 and then outwardly extends in the radial direction, and in the head portion 130 of the punch member 120 is formed a flow-out path 160 that outwardly extends in the radial direction, following the flow-out path 158, up to the outer peripheral surface of the head portion 130. Though not diagramed, the flow-in path 156 is connected to a source of supplying a cooling medium which may be the cooling water, via a suitable flexible pipe, and the flow-out path 160 is connected to a cooling medium collection means via a suitable flexible pipe. Therefore, the cooling medium circulates through the flow-in paths 156 and 154, tubular member 152, hole 148 in the kick-out member 118, and flow-out paths 158 and 160.

With reference to FIGS. 3-A and 5, the excess resin counter member 122 is constituted by a cylindrical member. At the upper end of the excess resin counter member 122 are formed two protrusions 162 that outwardly protrude in the radial direction from the two positions that are opposed to each other in the direction of diameter. An opening 164 is formed in the central portion of the annular plate 134, the excess resin counter member 122 is inserted into the opening 164 from the lower end thereof, and the protrusions 162 are engaged with the annular plate 134, whereby the excess resin counter member 122 is limited from moving downwardly. In the opening 164 of the annular plate 134 are formed expanded portions 166 at two positions that are opposed to each other in the direction of diameter (as will be described later, arcuate pieces of the punch member 124 and of the bushing member 126 are inserted in the expanded portions 166). As shown in FIG. 3-A, two recessed portions 168 are formed in the lower surface of head portion 130 of the punch member 120 to correspond to the two protrusions 162 formed at the upper end of the excess resin counter member 122, and the two protrusions 162 are held in the two recessed portions 168. A resiliently urging means 170 which may be a dished disc spring is disposed in each of the two recessed portions 168 to resiliently urge the excess resin counter member 122 downwardly. The descending motion of the excess resin counter member 122 is restricted because the two protrusions 162 formed at the upper end thereof come in contact with the upper surface of the annular plate 134. As shown in FIG. 3-A, the outer peripheral surface 172 at the lower end of the excess resin counter member 122 has the shape of a circular truncated cone that is tilted downwardly and inwardly in the radial direction.

With reference to FIGS. 3-A and 5, the push member 124 is constituted by a cylindrical member. The push member 124 has notches 174 formed at two positions opposed to each other in the direction of diameter thereof. Each of the notches 174 extends substantially vertically from the lower end to the upper end of the push member 124. Therefore, the push member 124 except the lower portion thereof is defined by two arcuate pieces 176 that have an arcuate shape in cross section. As clearly shown in FIG. 5, two holes 178 are formed in the head portion 130 of the punch member 120 at positions opposed to each other in the direction of diameter. Each of the two holes 178 has an arcuate shape in cross section and extends in the vertical direction penetrating through the head portion 130 of punch member 120. As will be understood from FIG. 3-A, the two arcuate pieces 176 of the push member 124 are inserted in the two holes 178 formed in the head portion 130 of punch member 120 from the lower side thereof passing through the expanded portions 166 in the opening 164 of the annular plate 134. Here, though the lower portion of the push member 124 is positioned under the head portion 130 of the punch member 120, the two arcuate pieces 176 of the push member 124 protrude upwardly penetrating through the head portion 130 of punch member 120. As clearly diagramed in FIG. 3-A, the lower surface 180 of the push member 124 has the shape of a circular truncated cone that is inclined inwardly and downwardly in the radial direction.

The bushing member 126 is also constituted by a nearly cylindrical member. The bushing member 126, too, has notches 182 at two positions opposed to each other in the direction of diameter. Each of the notches 182 extends substantially vertically from the lower end to the upper end of the bushing member 126. Therefore, the bushing member 126 except the lower portion thereof is defined by two arcuate pieces 184 that have an arcuate shape in cross section. As shown in FIG. 5, the two arcuate pieces 184 of the bushing member 126 are inserted in the two holes 178 formed in the head portion 130 of punch member 120 from the lower side thereof through the expanded portions 166 in the opening 164 of the annular plate 134. Though the lower portion of the bushing member 126 is positioned under the punch member 120, the two arcuate pieces 184 of the bushing member 126 protrude upwardly penetrating through the head portion 130 of punch member 120.

With reference to FIG. 2 together with FIG. 3-A, an interlocking piece 190 is coupled to the upper end of the arcuate piece 176 of the push member 124, and an interlocking piece 192 is coupled to the upper end of the arcuate piece 184 of the bushing member 126. A short shaft 194 that extends substantially horizontally is fitted to the upper end of the interlocking piece 190, and a cam roller 196 is rotatably mounted on the short shaft 194. Further, a short shaft 198 that extends substantially horizontally is fitted to the upper end of the interlocking piece 192, and cam rollers 200 and 202 are rotatably mounted on the short shaft 200. On the other hand, a support plate 204 is secured to the upper end portion of the stationary support shaft 6 of the main rotary molding apparatus 2, and a cam member 206 of a nearly cylindrical shape is secured to the peripheral edge of the support plate 204. In the outer peripheral surface of the cam member 206 are formed an annular cam groove 208, a downwardly faced annular cam surface 210 and an upwardly faced annular cam surface 212. The cam roller 196 of the push member 124 is held in the annular cam groove 208, and the cam rollers 200 and 202 of the bushing member 126 are in contact with the annular cam surfaces 210 and 212. As the rotary support member 6 of the main rotary molding apparatus 2 is rotated in a direction indicated by arrow 4 in FIG. 1, the push member 124 is elevated or lowered by the annular cam groove 208 and cam roller 196 that work in cooperation together, and the bushing member 126 is elevated or lowered by the annular cam surfaces 210, 212 and cam rollers 200, 202 that work in cooperation together. The elevating and lowering motions of the push member 124 and bushing member 126 will be described later in detail.

With reference again to FIGS. 3-A and 5, the sleeve member 128 as a whole is constituted by a cylindrical member. The sleeve member 128 has an outer peripheral surface in three steps, i.e., an upper end portion 214 with a large diameter, an intermediate portion 216, and a lower portion 218 with a small diameter. The small-diameter lower portion 218 has an external diameter that corresponds to the internal diameter of the container closure shell 32 on which the liner will be formed. The external diameter of the intermediate portion 216 corresponds to the internal diameter of the main portion 112 of the through opening 110 formed in the mounting member 96, and the external diameter of the large-diameter upper end portion 214 corresponds to the internal diameter of the intermediate portion 114 of the through opening 110 formed in the mounting member 96. The sleeve member 128 is slidably fitted to the mounting member 96 while its intermediate portion 216 and upper end portion 214 are, respectively, positioned in the main portion 112 and intermediate portion 114 of the through opening 110 of the mounting member 96. As clearly shown in FIG. 3-A, through holes 220 that extends in the vertical direction are formed in the upper end portion of the sleeve member 128 at two positions opposed to each other in the direction of diameter thereof, and pins 224 are screwed into the head portion 130 of the punch member 120 through the holes 220. A plurality of dished disc springs 226 are disposed to surround the pins 224 between the lower surface of head portion 130 of the punch member 120 and the upper surface of the sleeve member 128. The dished disc springs 226 work to resiliently urge the sleeve member 128 downwardly. The downward motion of the sleeve member 128 is restricted as the lower surface of large-diameter upper end portion 214 of the sleeve member 128 comes into contact with the upwardly faced shoulder surface that exists in a boundary between the main portion 112 and intermediate portion 114 in the through opening 110 of the mounting member 96. The above two pins 224 prevent the sleeve member 128 from rotating and work to lock the dished disc springs 226 at required positions. The inner peripheral surface of the sleeve member 128 is formed in two steps, i.e., has a large-diameter upper portion 228 and a small-diameter lower portion 230. The internal diameter of the large-diameter upper portion 228 corresponds to the external diameter of the push member 124, and the internal diameter of the small-diameter lower portion 230 corresponds to the extend diameter of the bushing member 216. The upwardly faced shoulder surface 232 that exists in the boundary between the large-diameter upper portion 228 and the small-diameter lower portion 230, has the shape of a circular truncated cone that is downwardly tilted toward the inside in the radial direction, and corresponds to the circular truncated cone formed at the lower end 180 of the push member 124.

Figure 6:
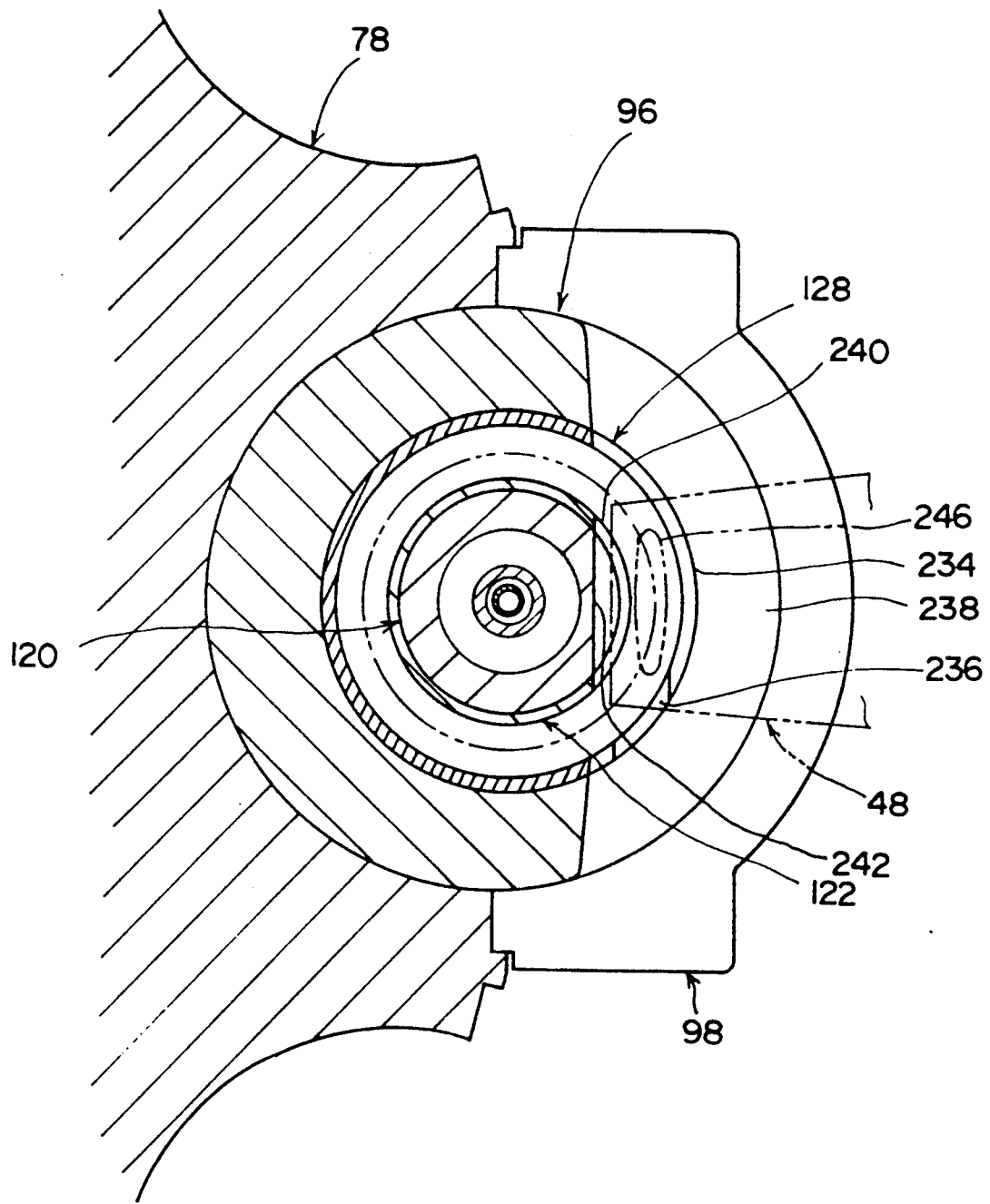
FIG. 6 is a sectional view showing part of the press tool assembly in the molding means in the main rotary molding apparatus of FIG. 2.

With reference to FIGS. 3-A and 5, it is important that in the annular liner-molding apparatus 2 constituted according to the present invention, the sleeve member 128 has a passage notch 234 and a non-passage notch 236 formed therein. With further reference to FIG. 6, the passage notch 234 in the diagramed embodiment extends arcuately in the circumferential direction in the middle portion in the vertical direction of the sleeve member 128. The intermediate portion in the circumferential direction of the passage notch 234 is located most far away from the center axis of the rotary support member 6 of the main molding apparatus 2, and extends over an angular range of about 80 degrees toward both sides in the circumferential direction from the intermediate portion thereof. The non-passage notch 236 is positioned immediately under the passage notch 234, and exists in only a part of the passage notch in the circumferential direction in which the passage notch 234 extends, i.e., exists on only the downstream side in the direction (indicated by arrow 4 in FIG. 1) in which the rotary support member 6 of the main molding apparatus 2 rotates. If considered on the locus of rotation of the support member 6, the passage notch 234 continuously exists (i.e., passes through) on the locus of rotation, but the non-passage notch 236 exists on the downstream side only (i.e., does not pass through) without continued on the locus of rotation. In the diagramed embodiment, the mounting member 96 has a passage notch 238 in relation to the passage notch 236 of the sleeve member 128. In order to secure the mounting member 96 at a required position, the upper end of the fastening member 98 is substantially in alignment with the lower edge of the passage notch 238. Furthermore, a passage notch 240 is formed in the excess resin counter member 122 and a passage recess 242 is formed in the punch member 120 in relation to the passage notch 234 of the sleeve member 128. The passage notches 234, 238, 240 and passage recess 242 are in alignment with each other in the vertical direction and are further in alignment with each other in the circumferential direction, so that they define a nearly fan-shaped notch in cooperation together.

As described with reference to FIG. 1, the resin material feeding means 20 that is disposed in relation to the resin material receiving zone 12 includes a feeder nozzle 48 that is selectively located at an acting position indicated by a solid line in FIG. 1. As will be clearly understood with reference to FIG. 3-C, when the feeder nozzle 48 is located at the acting position, its tip protrudes into the locus of notch that is defined by the above-mentioned passage notches 234, 238, 240 and passage recess 242 in cooperation together (since the tip of the feeder nozzle 48 protrudes into the locus of notch defined in the press tool assembly 92, the feeder nozzle 48 does not interfere with the press tool assembly 92 even when the press tool assembly 92 is rotated passing through a required path with the rotation of the rotary support member 6). As shown in FIG. 3-C, a resin flow path 244 is formed in the feeder nozzle 48, and the downstream end (i.e. the discharge port 246) of the resin flow path 244 is positioned at the lower surface at the tip of the feeder nozzle 48. As shown in FIG. 6, the discharge port 246 of the feeder nozzle 48 should be of an elongated shape in the moving direction of the press tool assembly 92 (in the direction indicated by arrow 4 in FIG. 1) or, more specifically, in the moving direction of the non-passage notch 236 that is formed in the sleeve member 128. When the synthetic resin material which is softened and melted is to be supplied to the press tool assembly 92, the softened and molten synthetic resin material 248 is discharged from the discharge port 246 of the feeder nozzle 48. The non-passage notch 236 formed at the lower portion of the passage notch 234 is formed only on the downstream side in the direction in which the sleeve member 128 moves (direction indicated by arrow 4 in FIG. 1). Therefore, the synthetic resin material 248 flowing out from the discharge port 246 enters into the sleeve member 128 as it moves, and is then interrupted with the wall (of which the upper edge defines the lower edge of the passage notch 234) that exists on the rear side (upstream side) in the direction in which the non-passage notch 236 moves, and is then cut away from the discharge port 246 by the cutting action created by the above wall and the lower surface of the feeder nozzle 48 that work in cooperation together. Thus, the softened and molten synthetic resin material 248 is supplied into space between the sleeve member 128 and the excess resin counter member 122 just under the passage notch 234. In the diagramed embodiment, the discharge port 246 is disposed in the lower surface of the feeder nozzle 48 and the non-passage nozzle 236 is disposed just under the passage notch 234. It is, however, also allowable to dispose the discharge port 246 in the upper surface of the feeder nozzle 48 and to dispose the non-passage notch 236 just above the passage notch 234 as desired.

Next, the anvil 94 that works in cooperation with the press tool assembly 92 and the related constitution will be described with reference to FIG. 2 and FIG. 3-A. As described earlier, circular openings 84 are formed in the lower support flange 80 of the rotary support member 6 in the main rotary molding apparatus 2 at an equal distance in the circumferential direction. Mounting members 250 are fastened to the openings 84 by a suitable means (not shown). The mounting member 250 has a nearly cylindrical shape and a center through opening 252 that is circular in cross section. A support member 254 is slidably fitted in the opening 252 that extends substantially vertically. The support member 254 has nearly a cylindrical shape, and further has a hole 260 that comprises a large-diameter upper portion 256 at the upper end thereof and a small-diameter lower portion 258. The anvil 94 has a circular upper wall 262, an outer hanging portion 264 that downwardly extends from the periphery of the upper wall 262, and an inner hanging portion 266 that downwardly extends down from the central portion of the upper wall 262. A circular recess 263 is formed at the central portion in the upper surface of the circular upper wall 262, the circular recess 263 having an internal diameter that corresponds to the outer shape of top panel 42 of the container closure shell 32 supplied thereto. Onto the upper surface of the circular upper wall 262 is secured a guide piece 265 of which the inside in the radial direction extends arcuately along the outer peripheral edge of the circular recess 263 as viewed from the center of the rotary support member 6. A through hole 268 is formed in the inner hanging portion 266. The upper end of the through hole 268 has a diameter which is greater than that of the lower portion, and has an upwardly faced shoulder surface 270 at the boundary portion. The inner hanging portion 266 of the anvil 94 has an external diameter that corresponds to the internal diameter of small-diameter lower portion 258 in the hole 260 of the support member 254. The inner hanging portion 266 is inserted in the small-diameter lower portion 258 in the hole 260 of the support member 254, whereby the anvil 94 is mounted on the support member 254 while being allowed to move in the vertical direction. A plurality of dished disc springs 272 are disposed in the large-diameter upper portion 256 in the hole 260 of the support member 254. The dished disc springs 272 that surround the inner hanging portion 266 of the anvil 94 work to resiliently urge the anvil 94 upwardly. A bolt member 274 is screwed into the support member 254 penetrating through the hole 268 that extends through the inner hanging portion 266 of the anvil 94. As the lower surface of head of the bolt member 274 comes in contact with the shoulder surface 270 of the hole 268, the anvil 94 is restricted from moving upwards. Short shafts 276 and 278 that extend substantially horizontally are fitted to the lower portion of the support member 254, and cam rollers 280 and 282 are rotatably fitted on the short shafts 276 and 278. On the other hand, an annular member 284 is secured onto the horizontal support base board 68, and annular cam members 286 and 288 are secured to the annular member 284. The annular cam member 286 has an upwardly faced annular cam surface 290, and the annular cam member 288 has a downwardly faced annular cam surface 292. The cam rollers 280 and 282 of the support member 254 work in cooperation with the annular cam surface 290 and 292, and the support member 254 and the anvil 94 mounted thereon are suitably raised or lowered with the rotation of the rotary support member in the direction indicated by arrow 4 in FIG. 1 (the manner of ascending or descending of the anvil 94 will be described later in detail).

Next, operation of the main rotary molding apparatus 2 will be described with reference to FIGS. 3-A to 3-G together with FIGS. 1 and 2. At the time when the molding means 8 passes through the container closure shell receiving zone 10 with the turning of the rotary support member 6 of the main molding apparatus 2, the press tool assembly 92 and the anvil 94 that constitute the molding means 8 are separated away from each other in the vertical direction as shown in FIG. 3-A. Under this condition, the container closure shell 32 is carried from the container closure shell feeding means 18 onto the circular recess 263 formed on the upper surface of circular upper wall 262 of anvil 94, the container closure shell 32 being carried in an inverted state, i.e., with the outer surface of its top panel 42 faced downwards and the free end of the skirt wall 44 faced upwards. The anvil 94 gradually rises while the molding means 8 moves toward the resin material receiving zone 12 from the container closure shell receiving zone 10, and the lower end of the press tool assembly 92 enters into the container closure shell 32 as shown in FIG. 3-B. More specifically, as will be easily understood from the comparison of FIG. 3-A with FIG. 3-B, when the anvil 94 is gradually lifted, the kick-out member 118 first comes in contact with the inner surface of top panel 42 of the container closure shell 32. As the anvil 94 further rises, the kick-out member 118, too rises, against the resiliently urging action of the resiliently urging means 144. As the anvil 94 rises further, the sleeve member 128, excess resin counter member 122 and punch member 120 enter into the container closure shell 32, and come in contact with the inner surface of top panel 42 of the container closure shell 32, whereby the container closure shell 32 is slightly moved downwards against the resiliently urging action of dished disc springs 272. The outer shape of small-diameter lower portion 218 of the sleeve member 128 corresponds to the internal diameter of skirt wall 44 of the container closure shell 32, and the press tool assembly 92 and the container closure shell 32 are brought in alignment with each other in the axial direction as the sleeve member 128 enters into the container closure shell 32. As shown in FIG. 3-B, the push member 124 and bushing member 126 in the press tool assembly 92 are maintained at the uppermost positions, and the lower ends thereof are located above the passage notch 234 that is formed in the sleeve member 128.

Next, the softened and melted synthetic resin material 248 is fed to the press tool assembly 92 while the molding means 8 moves passing the resin material receiving zone 12. More specifically, with reference to FIG. 3-C, the softened and molten synthetic resin material 248 is discharged in a required amount from the discharge port 246 of feeder nozzle 48 in the resin material feeding means 20, while, after the preceding molding means 8 has passed the resin material receiving zone 12, the next molding means 8 passes the resin material receiving zone 12. When the press tool assembly 92 of the molding means 8 passes the resin material receiving zone 12, the tip of the feeder nozzle 48 at the acting position is located in the locus of notch defined by the passage notch 238 formed in the mounting member 96, passage notch 234 of sleeve member 128 in the press tool assembly 92, passage notch 240 of the excess resin counter member 122, and passage recess 242 in the punch member 120 that work in cooperation together as described earlier, and hence, is moved relative to the notch. On the other hand, the synthetic resin material 248 discharged from the discharge port 246 of the feeder nozzle 48 is positioned in the locus of non-passage notch 236 that is formed in the sleeve member 128, and at a moment when the sleeve member 128 moves passing the resin material receiving zone 12, passes the non-passage notch 236 and enters into the sleeve member 128 or, more specifically, enters into space between the large-diameter upper portion 228 in the inner peripheral surface of the sleeve 128 and the outer peripheral surface of the excess resin counter member 122. Here, the non-passage notch 236 exists on the downstream side only in the direction in which the sleeve member 128 moves but does not exist on the upstream side, as described earlier. Therefore, at a moment when the press tool assembly 92 passes the resin material receiving zone 12, the wall that exists just under the passage notch 234 on the upstream side in the moving direction of the sleeve member 128 (the upper edge of the wall defines the lower edge of the passage notch 234) interrupts the synthetic resin material 248 that has entered into the sleeve member 128, such that the synthetic resin material 248 discharged from the discharge port 246 is cut away therefrom in cooperation with the lower surface of the feeder nozzle 48. Thus, the softened and molten synthetic resin material 248 is supplied in a required amount into a required portion in the press tool assembly 92.

While the molding means 8 moves passing the molding zone 14, the synthetic resin material 248 is forced into a required position on the inside surface of top panel 42 of the container closure shell 32 and is formed into an annular liner. In carrying out the above molding, the push member 124 and the bushing member 126 are first lowered. As will be clearly understood with reference to FIGS. 3-D and 3-E, the push member 124 and the bushing member 126 are lowered substantially simultaneously in the diagramed embodiment. Here however, the push member 124 is lowered at a speed faster than the lowering speed of the bushing member 126 ; i.e., the push member 124 is lowered earlier than the bushing member 126. At a moment when the bushing member 126 is lowered up to the non-passage notch 236 in the sleeve member 128 to act upon the synthetic resin material 248 as is clearly diagramed in FIG. 3-D, the push member 124 has already been lowered to the lowermost position, and the lower surface 180 having the shape of a circular truncated cone of the push member 126 is brought in contact with the shoulder surface 232 having the shape of a circular truncated cone in the inner peripheral surface of the sleeve member 128. With lowering of the push member 124, the synthetic resin material 248 that exists over the whole large-diameter upper portion in the radial direction in the inner periphery of the sleeve member 128 is forced toward the inside in the radial direction (i.e., forced toward the portion that corresponds to the width of the small-diameter lower portion). If desired, the bushing member 126 may be started to descend after the push member 124 is lowered to the lowermost position shown in FIG. 3-D. The bushing member 126 continues to descend even after the push member 124 has reached to the lowermost position, whereby the synthetic resin material 248 downwardly moves in the small-diameter lower portion 230 in the inner peripheral surface of the sleeve member 128 as shown in FIG. 3-E, and is pressed onto the peripheral region on the inside surface of top panel 42 of the container closure shell 32. When the bushing member 126 is lowered to the lowermost position shown in FIG. 3-F, an annular liner 294 of a required shape is formed on the inside surface of top panel 42 of the container closure shell 32.

It is very difficult, although it is possible, to extremely precisely control the amount of the synthetic resin material 248 fed to the press tool assembly 92 in the resin material receiving zone 12, and the amount of the synthetic resin material 248 fed to the press tool assembly 92 undergoes a variation to a small degree. In the diagramed embodiment, the synthetic resin material 248 is fed to the press tool assembly 92 in an amount slightly in excess of the amount that is required for forming the annular liner 294. When the bushing member 126 is lowered to the predetermined lowermost position, a large pressure is exerted on the outer peripheral surface 172 of the excess resin counter member 122 that has the shape of a circular truncated cone which is downwardly and inwardly tilted in the radial direction since the synthetic resin material 248 is fed in a slightly excess amount and, in consequence, the excess resin counter member 122 rises slightly against the resiliently urging action of the resiliently urging means 170. The rising degree of the excess resin counter member 122 varies depending upon the amount of the synthetic resin material 248 that is fed to the press tool assembly 92. On the other hand, the mostly lowered position of the bushing member 126 has been fully accurately set to a predetermined position. Therefore, the main region of the annular liner 294 (FIG. 3-G) defined by the lower end of the bushing member 126 is stably molded into a required shape having a required thickness irrespective of the amount of the synthetic resin material 248 fed. The thickness of the innermost peripheral region of the annular liner 294 defined by the lower end of the excess resin counter member 122 is varied to some extent depending upon a change in the amount of the synthetic resin material 248 fed, whereby the excess amount of the synthetic resin material 248 fed is suitably compensated. The variation in the thickness of the innermost peripheral region of annular liner 294 caused by a change in the amount of the synthetic resin material to be fed is made sufficiently uniform and is suppressed to a relatively small amount over the entire circumferential direction, and the liner does not become ill-shaped to such a degree that can be easily perceived by the consumers.

Attention should also be given to the following fact in carrying out the above-mentioned molding using the bushing member 126 and push member 124. That is, the sleeve member 128 has the large-diameter upper portion 228 on the inner peripheral surface thereof, and the synthetic resin material 248 is fed to such large-diameter upper portion 228. This makes it possible to very easily and quickly supply the synthetic resin in an amount sufficient for forming the annular liner 294. On the other hand, the synthetic resin material 248 fed is first forced inwardly in the radial direction by the action of the push member 124, and is then forced to the peripheral region on the inside surface of top panel 42 of the container closure shell 32 through the small-diameter lower portion 230 in the inner peripheral surface of the sleeve member 128 by the action of the bushing member 126. Since the synthetic resin material 248 is permitted to flow in two steps, i.e. the first step comprising mainly a flow toward the inside in the radial direction and the second step comprising a flow directed downwards, there does not develop such a trouble that the synthetic resin material 248 remains in considerable amounts, for example, on the shoulder surface 232 on the inner peripheral surface of the sleeve member 128. Thus, it is possible that the synthetic resin material 248 flows highly satisfactorily to form the annular liner 294.

The bushing member 126 is lowered to the lowermost position to mold the annular liner 294 which is then cooled to a temperature lower than a predetermined temperature. Then, the anvil 94 is lowered, and the press tool assembly 92 moves upwards and is separated away from the container closure 58 that has the resultant molded liner 294 as shown in FIG. 3-G. In the initial stage of lowering of the anvil 94, the kick-out member 118 is gradually protruded downwards as the anvil 94 is lowered being resiliently urged by the resiliently urging means 144, whereby the punch member 120, excess resin counter member 122, bushing member 126 and sleeve member 128 in the press tool assembly 92 are very easily and stably separated away from the container closure 58. Furthermore, at the time when the anvil 94 is lowered, the push member 124 and bushing member 126 in the press tool assembly 92 are raised to their uppermost positions. When the molding means 8 passes the container closure discharge zone 16, the container closure 58 on the anvil 94 is discharged to the container closure discharge means 22.

Preferred embodiments of the apparatus for forming an annular liner constituted in accordance with the present invention were described above in detail in conjunction with the accompanying drawings, but it should be noted that the present invention is in no way limited to the above embodiments only but can be varied or modified in a variety of other ways without departing from the scope of the present invention.

What we claim is:

1. An apparatus for forming an annular liner on the inside surface of a top panel of a container closure shell, comprising:
   molding means;
   means for conveying said molding means through a container closure shell receiving zone, a resin material receiving zone, a molding zone and a container closure discharge zone;
   a container closure shell feeding means which feeds a container closure shell having a circular top panel to said molding means in said container closure shell receiving zone;

a resin material feeding means which feeds a synthetic resin material to said molding means in said resin material receiving zone; and a container closure discharge means which discharges the container closure shell from said molding means while in the container closure discharge zone and following passage of said closure shell through said resin material receiving zone; and wherein said molding means includes an anvil on which the container closure shell is placed in an inverted state by said container closure shell feeding means, and a press tool assembly which is disposed above said anvil being faced thereto and adapted to move in a direction to approach or separate away from said anvil;

said press tool assembly includes a punch member (120), a cylindrical bushing member (126) arranged on the outside of said punch member (120) and a cylindrical sleeve member (128) arranged on the outside of said bushing member (126), said bushing member (126) being moveable relative to said punch member (120) and said sleeve member (128);

said sleeve member (128) is provided with a circumferentially and an axially extending passageway (234 and 236), and said axially extending passageway (236) opening into said circumferentially extending passageway (234);

said resin material feeding means includes a feeder nozzle which has a discharge port; and said feeder nozzle (48) and said axially and circumferentially extending passageways being dimensioned and arranged such that said feeder nozzle (48) extends within said circumferentially extending passageway (234) when said conveying means (6) conveys said molding means (8) within said resin material receiving zone (12) and such that resin material discharged from said discharge port (246) enters into said sleeve member (128) upon passing said axially extending passageway (236) and is separated from said discharge port (246) upon exiting said circumferentially extending passageway (234).

2. An apparatus for forming an annular liner according to claim 1, wherein said press tool assembly includes a cylindrical excess resin counter member that is disposed between said punch member and said bushing member, and said excess resin counter being dimensioned and arranged such that the synthetic resin material discharged from said nozzle is fed into between said sleeve member and said excess resin counter member.

3. An apparatus for forming an annular liner according to claim 2, further comprising a resilient member and wherein said excess resin counter member is moveably supported in said press member and resiliently urged by said resilient member such that said excess resin counter member lifts and compresses said resilient member when a predetermined quantity of resin is received in said sleeve member.

4. An apparatus for forming an annular liner according to claim 1, wherein an internal diameter of an upper portion of said sleeve member is greater than an internal diameter of a lower portion thereof, an external diameter of said bushing member corresponds to the internal diameter of said lower portion of said sleeve member, said press tool assembly includes a cylindrical push member and camming means for moving said push member, said push member having an internal diameter corresponding to the external diameter of said bushing member and an external diameter corresponding to the internal diameter of said upper portion of said sleeve member, said push member being moveably supported within said press member by said camming means such that said push member is adapted to ascend or descend between said upper portion of said sleeve member and said bushing member, and said camming means being dimensioned and arranged such that said push member is positioned above said circumferential passageway formed in said sleeve member when said molding means moves within said resin material receiving zone and said push member is lowered when said molding means moves out of said molding zone.

5. An apparatus for forming an annular liner according to claim 4, wherein said camming means is dimensioned and arranged such that said molding means moves out of said molding zone, said push member is lowered in advance of said bushing member.

6. An apparatus for forming an annular liner according to claim 4, wherein a tilted surface is formed on the inner surface of a boundary region between said upper portion and said lower portion of said sleeve member, said tilted surface being tilted downwardly and inwardly in the radial direction, and the lower end surface of said push member is tilted downwardly and inwardly in the radial direction to correspond to said tilted surface.

7. An apparatus for forming an annular liner according to claim 1, wherein said discharge port formed in said feeder nozzle of said resin material feeding means extends in an elongated shape in the direction in which said molding means moves.

8. An apparatus for forming an annular liner of synthetic resin on the inside surface of a top panel of a container closure shell, comprising:

molding means which includes an anvil on which said container closure shell is placed in an inverted state, a press tool assembly which is disposed being opposed to said anvil, and moving means for positioning said anvil and press tool assembly in a closely adjacent position or a separated position, and said press tool assembly including a punch member (120) which is adapted for contact with the closure shell when said press tool assembly and said anvil are in the closely adjacent position, an excess resin counter member (122) which is adapted for movement with respect to said punch member and is arranged on an exterior portion of said punch member (120), a bushing member (126) arranged on an exterior portion of said excess resin counter and adapted for movement with respect to said punch member, and a sleeve member arranged on an exterior portion of said bushing member and adapted for contact with the closure shell when said press tool assembly and said anvil are in the closely adjacent position, and said press tool assembly further comprising resilient urging means for biasing said excess resin counter in a direction toward said anvil and said resilient urging means having a resiliency value which results in said excess resin counter being shiftable away from said anvil and moveable with respect to said bushing member upon an excess amount of synthetic resin being placed in contact with said bushing member.

9. An apparatus for forming an annular liner according to claim 8, wherein an outer peripheral surface at a lower end of said excess resin counter member has the shape of a circular truncated cone that is tilted inwardly in the radial direction toward said anvil.

10. An apparatus as recited in claim 8 wherein said bushing member of said press tool assembly is mounted to move relative to both said punch member and said excess resin counter and said apparatus further comprising means for moving said bushing member between an uppermost position and a lowermost position.

11. An apparatus for recited in claim 10 further comprising means for feeding the synthetic resin material into a space provided below said bushing member while in the uppermost position and external to said excess resin counter and internal to said sleeve member.

12. An apparatus as recited in claim 10 wherein said means for moving said bushing member is dimensioned and arranged to place a lower edge of said bushing member a predetermined and fixed distance away from a top panel of the closure shell while in said lowermost position and to maintain the lower edge in that position during a period wherein the synthetic resin liner is being formed such that pressure created by excess resin between the lower edge of said bushing member and the top panel is relieved through an upward shifting of said excess resin counter.

13. An apparatus as recited in claim 12 wherein said means for moving said bushing member includes a fixed cam track and a cam roller.

14. An apparatus as recited in claim 8 further comprising a cylindrical push member positioned external to said bushing member and internal to said sleeve member and camming means for moving said push member with respect to said sleeve member and said bushing member.

15. An apparatus as recited in claim 14 wherein said sleeve member includes an inner peripheral surface having a first large diameter portion, a sloped intermediate edge portion, and a smaller diameter aperture, and said push member having an inclined edge, which is adapted for contact with the sloped intermediate edge portion, and said bushing member having an exterior surface in sliding engagement with the smaller diameter portion.

16. An apparatus as recited in claim 14 wherein said sleeve member includes a circumferential slot which is dimensioned and arranged to receive a feeder nozzle of a resin material feeding means therein, and said push member being moveable between a first position wherein the circumferential slot is open and a second position wherein said circumferential slot is closed.

17. An apparatus as recited in claim 8 further comprising a spring member for biasing said sleeve downwardly with respect to said punch member.

* * * * *